(12) United States Patent
Creswell et al.

(10) Patent No.: US 6,405,756 B2
(45) Date of Patent: Jun. 18, 2002

(54) VALVE CARTRIDGE WITH REDUCED TOLERANCE STACK-UP

(75) Inventors: Robert S. Creswell, Grand Rapids; Jimmie D. Chrysler, Wyoming, both of MI (US)

(73) Assignee: Amerikam, Inc., Grand Rapids, MI (US)

( * ) Notice: Subject to any disclaimer, the term of this patent is extended or adjusted under 35 U.S.C. 154(b) by 0 days.

(21) Appl. No.: 09/751,067

(22) Filed: Dec. 28, 2000

Related U.S. Application Data

(60) Provisional application No. 60/173,277, filed on Dec. 28, 1999.

(51) Int. Cl.[7] ............................................. F16K 11/078
(52) U.S. Cl. ................................. 137/625.17; 137/625.4
(58) Field of Search ........................ 137/625.17, 625.4, 137/454.6, 454.5

(56) References Cited

U.S. PATENT DOCUMENTS

| | | | | |
|---|---|---|---|---|
| 5,080,134 A | * | 1/1992 | Orlandi | 137/625.17 |
| 5,375,624 A | * | 12/1994 | Knapp | 137/625.17 |
| 5,417,242 A | * | 5/1995 | Goncze | 137/625.4 X |
| 6,199,586 B1 | * | 3/2001 | Pawelzik et al. | 137/625.17 X |

* cited by examiner

Primary Examiner—Kevin Lee
(74) Attorney, Agent, or Firm—McGarry Bair LLP

(57) ABSTRACT

A valve cartridge for controlling the flow of fluid from a fluid source to a fluid outlet, the valve cartridge comprising a valve body having a first body portion and a second body portion. A valve cartridge comprising a fixed ceramic plate and a moveable ceramic plate is mounted within the body. A biasing element is disposed between the moveable ceramic plate and the second body portion for biasing the moveable ceramic plate against the fixed ceramic plate. The first and second body portions are coupled together such that a portion of the second body portion biases the fixed ceramic plate against the first valve body portion to compressibly retain the first ceramic plate there against and independently of the biasing element biasing the rotating ceramic plate against the fixed ceramic plate.

21 Claims, 12 Drawing Sheets

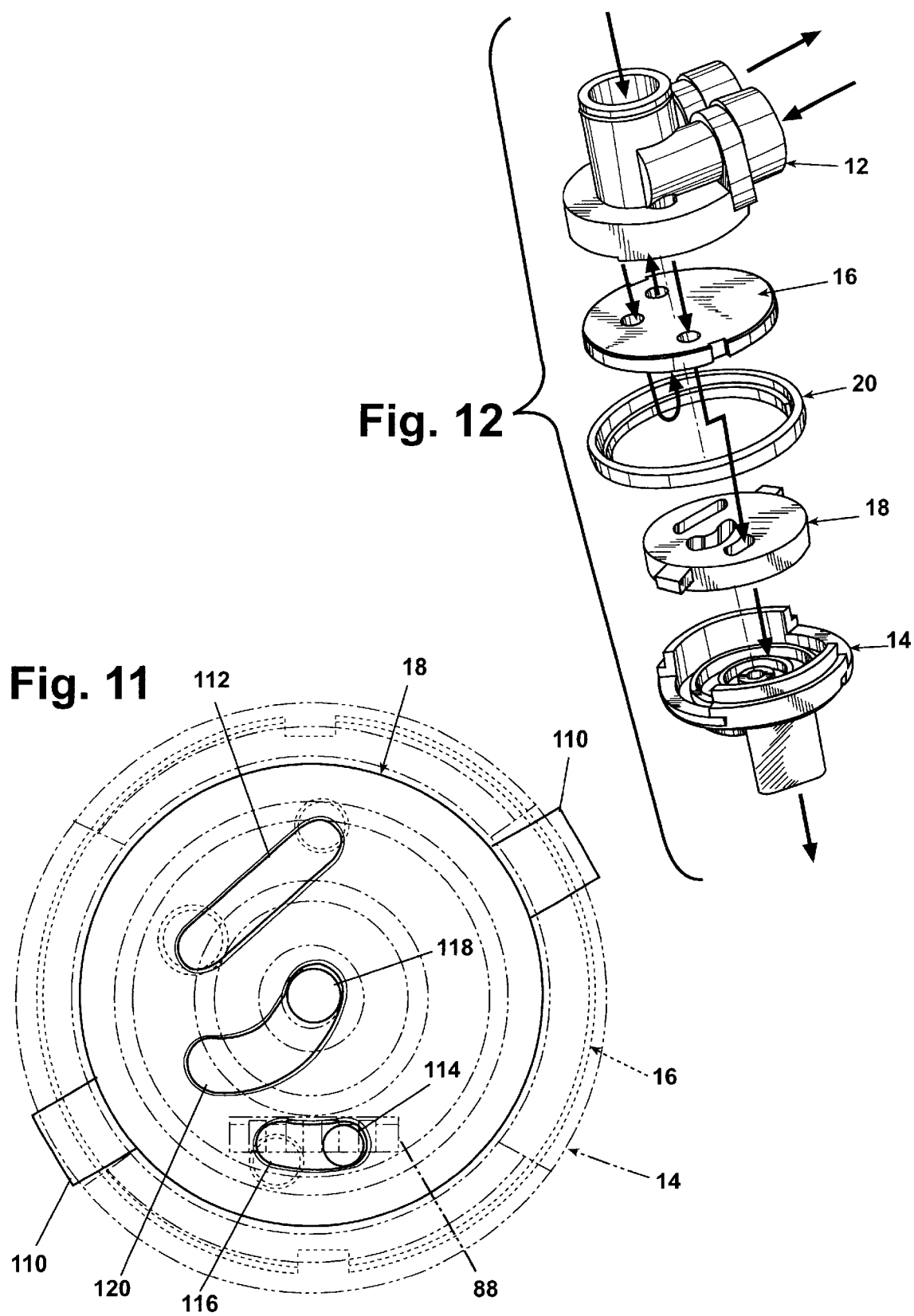

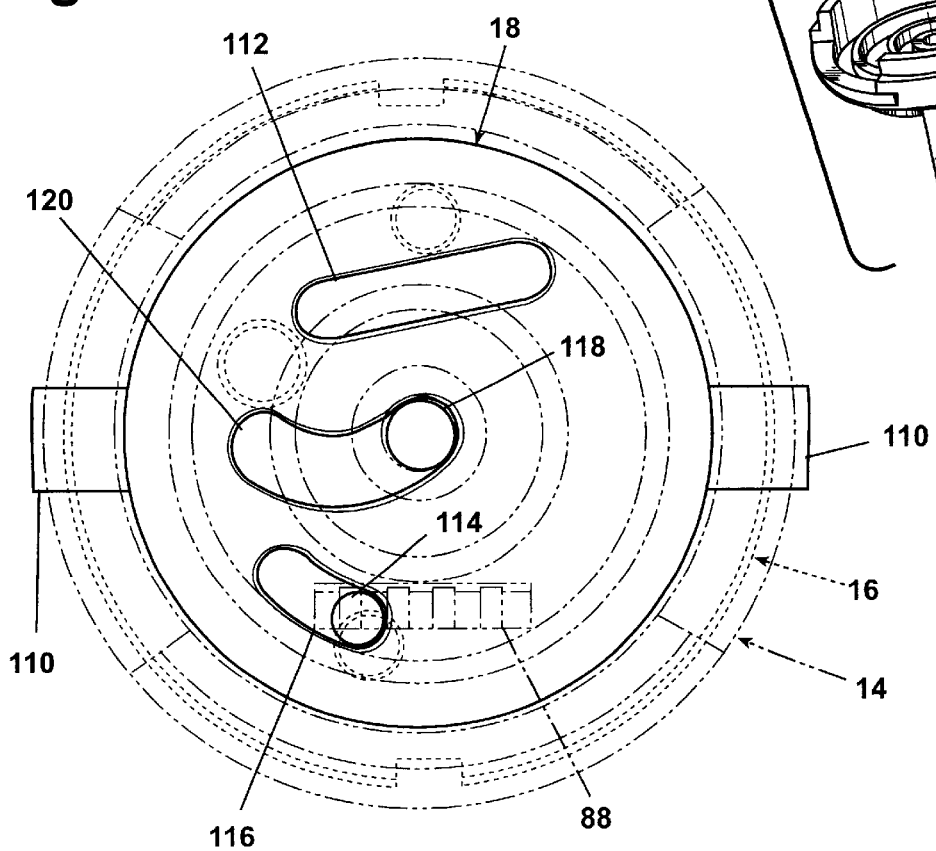
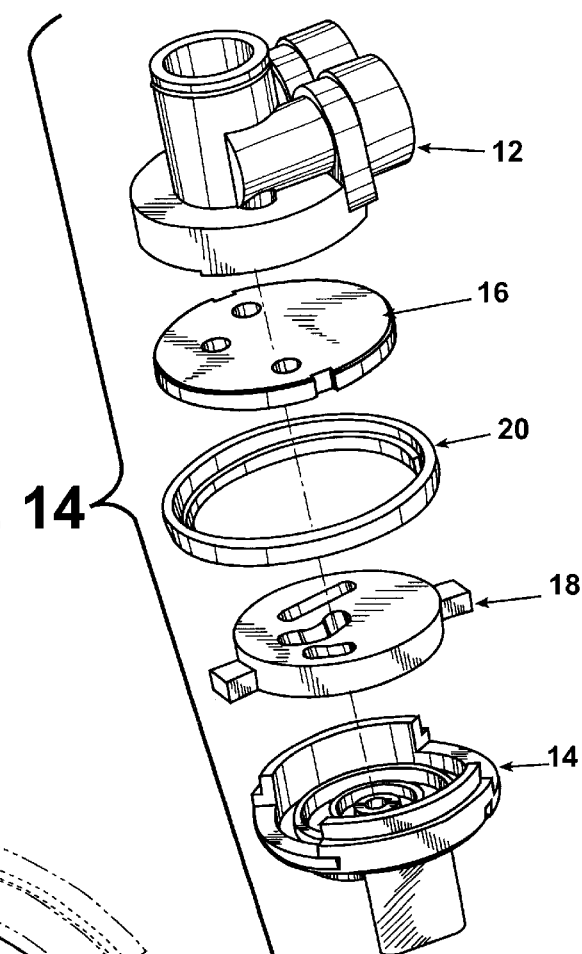
Fig. 13
Fig. 14

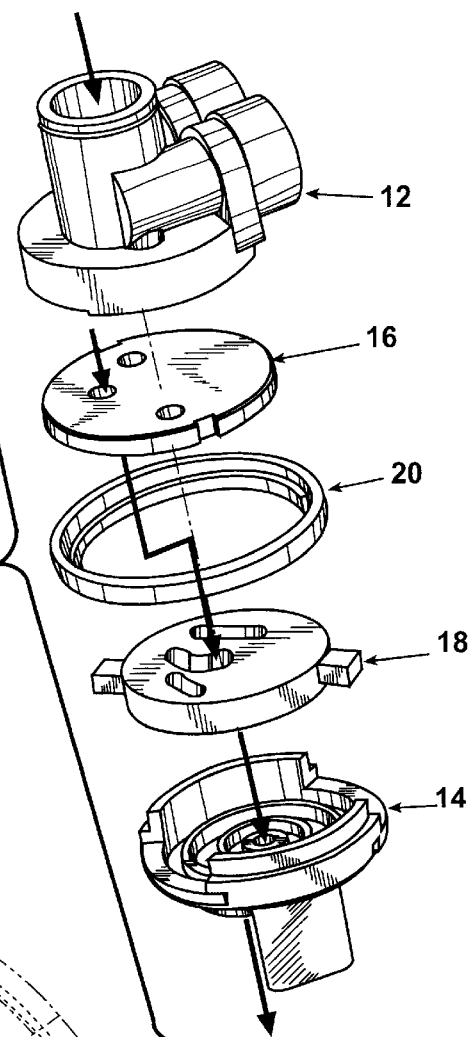
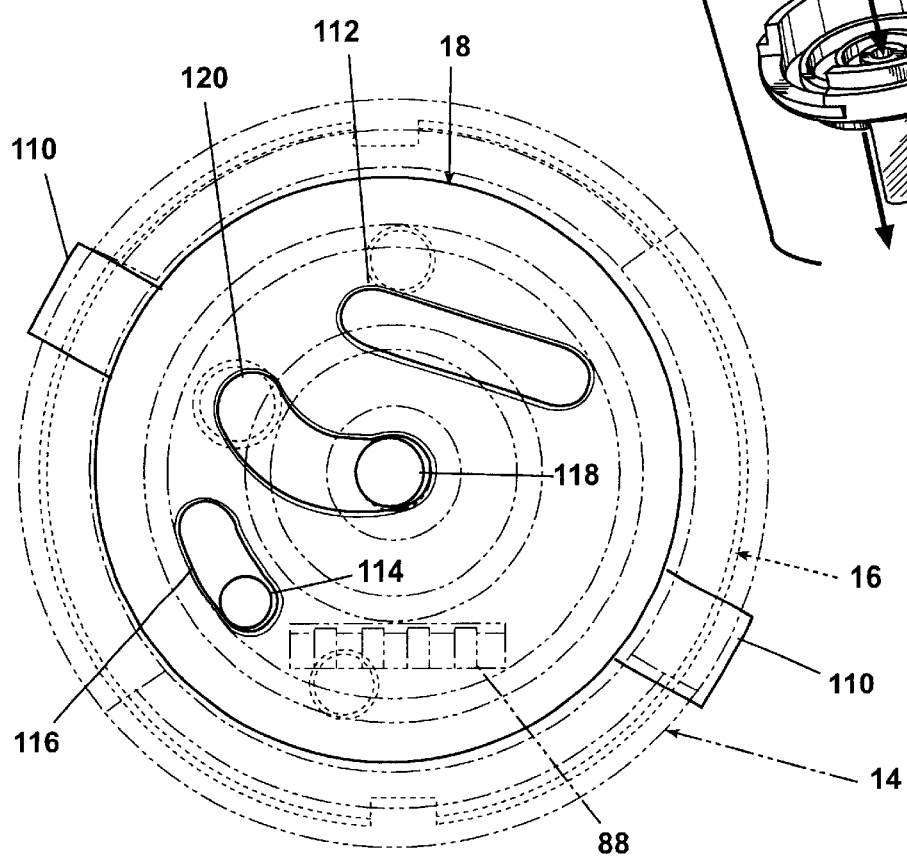

VALVE CARTRIDGE WITH REDUCED TOLERANCE STACK-UP

RELATED APPLICATIONS

This application claims priority on U.S. Provisional Application No. 60/173,277, filed Dec. 28, 1999.

BACKGROUND OF THE INVENTION

1. Field of the Invention

The invention relates to a valve cartridge having a valve stack-up comprising a rotating ceramic disk and a fixed ceramic disk, both with pass-through openings that are brought into alignment to control the flow of fluid through the valve; and, more particularly, to a valve cartridge having reduced tolerance variations between the stack-up elements to better control the tight seal between the ceramic disks while permitting their rotation.

2. Description of the Related Art

Fluid valves using ceramic valve stacks comprising a fixed ceramic disk and a rotating ceramic disk, both of which have pass-through openings that are aligned and unaligned to control the flow of fluid through the valve, are widely known and appear in various configurations, such as in-line valves, diverter valves, and hydrants, to name a few. Almost all ceramic valves comprise a "stack-up" that traditionally includes an O-ring, a fixed ceramic disk, a rotating ceramic disk, and a bearing in contact with the rotating ceramic disk. The stack-up is typically contained within a valve body, which defines the various inlets and outlets to the fluid sources.

For the ceramic valve to work properly, the fixed and rotating ceramic disks must be held together in compression with a pressure (the stack-up pressure) sufficient to prevent fluid from leaking between the interface of the disks while having a rotating force less than a predetermined value. Typically, the stack-up pressure is applied by securing a valve body holding the stack-up against a compression seat, or securing a retainer to the end of the valve body as disclosed in U.S. Pat. No. Re. 35,545. The rotating force is the force that a user must supply to the handle of the valve to rotate the rotating disk with respect to the fixed disk to turn the valve through its various operating positions. Although there is some subjectivity in the desired rotating force, the force must always remain low enough to permit the weakest of users to easily operate the valve.

Striking a balance between the required stack-up pressure to prevent the ceramic valve from leaking and the desired rotating pressure is a problem for all valves using a ceramic stack-up. The problem is exacerbated in that it is very difficult to control the tolerance variations of the ceramic disks during their manufacture. The variation in the ceramic disks can vary the stack-up pressure that is required for a particular pair of ceramic disks.

It is highly desirable to produce a ceramic valve that provides better control over the stack-up pressure to thereby provide better control over the stack-up pressure and the rotating pressure of the valve.

SUMMARY OF THE INVENTION

The invention relates to a valve cartridge for controlling the flow of fluid through a fluid conduit that fludily connects a fluid source to a fluid outlet. The valve cartridge comprises first and second valve body portions. The valve body portions define a flow passage fluidly connecting the fluid source to the fluid outlet when the valve cartidge is fluidly coupled to the fluid conduit. The first and second valve body portions define a longitudinal axis.

A first ceramic plate is mounted to the first body portion within the flow passage and with the longitudinal axis extending through the first plate such that the first ceramic plate is axially immovable relative to the first body portion. A second ceramic plate is mounted to the second body portion within the flow passage such that the second ceramic plate is movable along the longitudinal axis and maintained in an axially facing relationship with the first ceramic plate. Each of the first and second ceramic plates have pass-through openings and are movable relative to each other between a first position, where the pass-through openings are not aligned, and a fluid flow through the flow passage is prohibited, and a second position, where the pass-through openings are aligned to permit fluid flow through the flow passage. A biasing element is disposed between the second body portion and the second ceramic plate to bias the second ceramic plate against the first ceramic plate along the longitudinal axis.

Preferably, the valve cartridge further comprises a bearing disposed between one of the first or second body portions and the corresponding first or second ceramic plates. The bearing is in abutting relationship with the corresponding first or second plate to protect the one of the first and second body portions from the relative movement of the first and second ceramic plates. The second body portion can have a bottom wall against which the second ceramic plate abuts and the bottom wall forms the bearing.

At least one channel is formed in the bottom wall and the biasing element is preferably a resilient seal disposed within the at least one channel to seal the second ceramic plate relative to the second body portion and to bias the second ceramic plate against the first ceramic plate. The resilient seal is preferably an O-ring and the second body portion pass-though opening is located in the bottom wall such that it is circumscribed by the O-ring.

The first body portion can comprise a top wall and an annular wall that depends from the top wall. The top wall and annular wall define a recess that is sized to receive the first ceramic plate to form a first valve seat within which the first ceramic plate is retained. The second body portion comprises a collar that defines a portion of a recess sized to receive the second ceramic plate and forming a second valve seat in which the second ceramic plate is received. The collar is preferably sized such that it abuts the first ceramic plate to bias the first ceramic seat within the first valve seat to compressibly retain the first ceramic plate against the top wall. Alternatively, the first body portion can comprise a radially extending lip that retains the first ceramic plate within the first body recess.

The collar has an upper end that is approximately coterminous with an upper surface of the second ceramic plate. The depth of the second body portion recess is approximately equal to the thickness of the second ceramic plate.

The collar has at least one notch formed therein and the second ceramic plate has a key extending through the notch wherein the second ceramic plate is moved between the first and second positions between the ends of the notch. Preferably, the collar comprises two diametrically opposed notches and the second ceramic plate has two diametrically opposed keys. The valve cartridge further comprises an outer collar circumscribing the second body portion having keyholes that receive the second ceramic plate key, wherein the rotation of the outer collar moves the second ceramic plate.

The first body portion preferably further comprises at least one key extending into the first body portion recess and the first ceramic plate having a keyhole sized to receive the key when the first ceramic plate is received within the recess to fix the rotational position of the first ceramic plate relative to the first body portion.

Preferably, the first and second ceramic plates are disks. The first and second body portions and the first and second ceramic disks can have multiple fluid openings that permit the rotation of the disks between a first position where fluid flow through the valve cartridge is prohibited, a second position where fluid flow through the valve cartridge is permitted, and a third position where fluid flow through the valve cartridge is bypassed through a filter element.

The biasing device is preferably made from a resilient material. The characteristics of the resilient material are selected to control the force supplied by the bypassing element to the second ceramic plate. Preferably, the hardness and size of the resilient material are the selected and controlled characteristics. The biasing element is preferably an O-ring seal.

Preferably, the first ceramic plate is located at a fixed position along the longitudinal axis independent of the position of the second ceramic plate along the longitudinal axis.

BRIEF DESCRIPTION OF THE DRAWINGS

In the drawings:

FIG. 11 is a partial assembly view of the fixed ceramic disk, rotating ceramic disk, and the lower valve body shown with the rotating ceramic disk in a filtered flow operational position wherein the water supply coming into the valve is diverted to a filter and returned to the valve body where it exits a spray opening;

FIG. 12 illustrates the water flow path through the valve body when the rotating ceramic disk is in the filtered flow position;

FIG. 13 illustrates the relative positions of the fixed ceramic disk, rotating ceramic disk, and lower valve body when the rotating ceramic disk is in a neutral position where the water input is not fluidly connected to either an external filter or directly passing through the valve;

FIG. 14 illustrates the fluid flow path through the valve when the rotating ceramic disk is in the neutral position;

FIG. 15 illustrates the relative positions of the fixed ceramic disk, rotating ceramic disk, and the lower valve body when the rotating ceramic disk is in a pass-through position where the fluid entering the valve passes directly through the valve body without being diverted to a filter and exiting the spout;

FIG. 16 illustrates the fluid flow path through the valve when the rotating ceramic disk is in the direct flow through position.

DESCRIPTION OF THE PREFERRED EMBODIMENT

Figure 1:
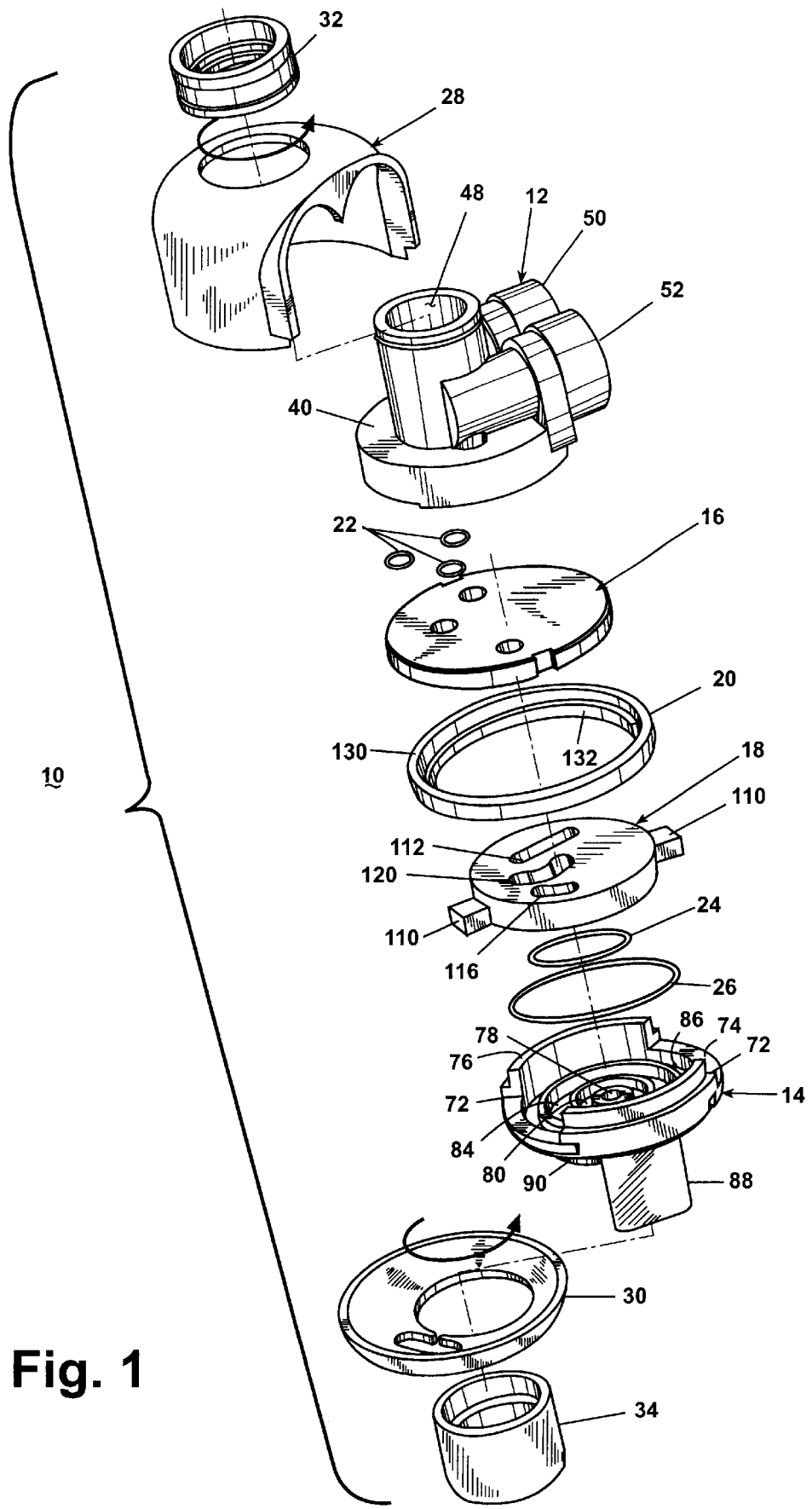
FIG. 1 is an exploded view of a two-position diverter valve comprising a ceramic stack-up in accordance with the invention.

FIG. 1 illustrates a valve cartridge 10 according to the invention. The valve cartridge 10 comprises an upper valve body portion 12 and a lower valve body portion 14 that together retain a fixed ceramic disk 16 and a rotating ceramic disk 18, whose rotational operation is controlled by a selection ring 20. O-rings 22 seal the fixed ceramic disk 16 with respect to the upper valve body portion 12. O-rings 24, 26 seal the rotating ceramic disk 18 with respect to the lower valve body portion 14.

An upper housing cover 28 and lower housing cover 30 are shaped to fit over the assembled upper valve body portion 12 and lower valve body portion 14, respectively, to provide an aesthetic cover for the upper and lower valve body portions 12, 14. Additionally, a collar 32 mounts to the upper cover 28 to aid in the connection of the valve to water supply. A nozzle 34 mounts to the lower body portion 14 to control the valve flow of fluid from the valve cartridge. The covers 28, 30, collar 32, and nozzle 34 are not germane to the function of the valve 10 and will not be described in greater detail.

Figure 2:
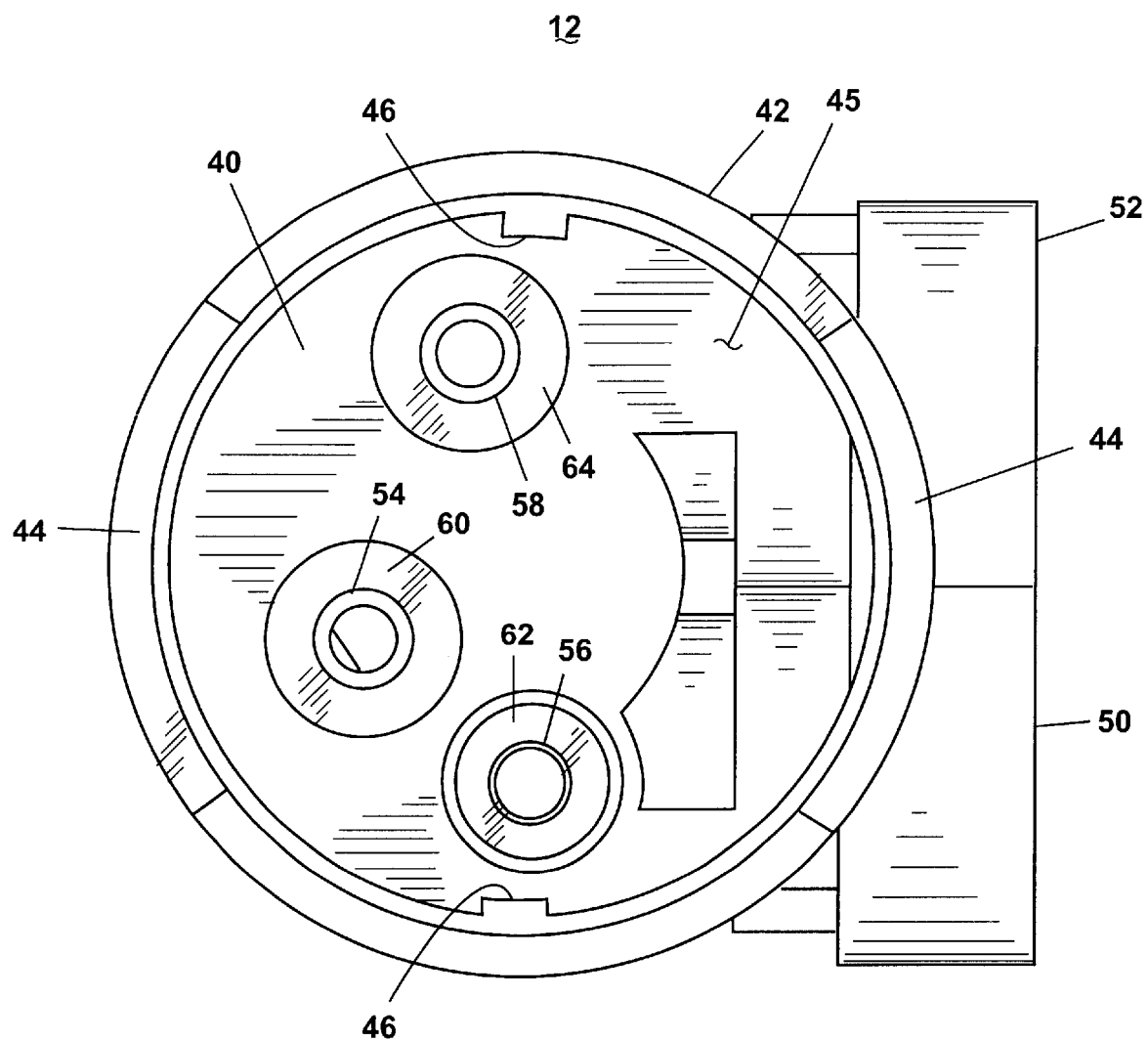
FIG. 2 is a bottom view of the upper valve body.

The various functional components of the valve cartridge 10 will now be described in greater detail. Referring to FIGS. 1 and 2, the upper valve body portion 12 comprises a top wall 40 having a depending annular wall 42, which is interrupted by opposing notches 44. The top wall 40 and the annular wall 42 define a recess 45 that forms a seat for the fixed disk 16. Keys 46 extend away from the annular wall 42. A tubular inlet 48 (FIG. 16) extends upwardly from the top wall 40 and defines an inlet chamber that is in fluid communication with a fluid source when the valve is assembled. A filter inlet 50 extends horizontally relative to the top wall 40. Similarly, a filter outlet 52 extends horizontally away from the top wall 40. The fluid inlet 48, filter inlet 50, and filter outlet 52 are all fluidly connected to the interior of the upper valve body portion 12 through pass-through openings 54, 56, 58, respectively, which are surrounded by annular channels 60, 62, and 64, which are sized to receive the O-rings 22.

Figure 3:
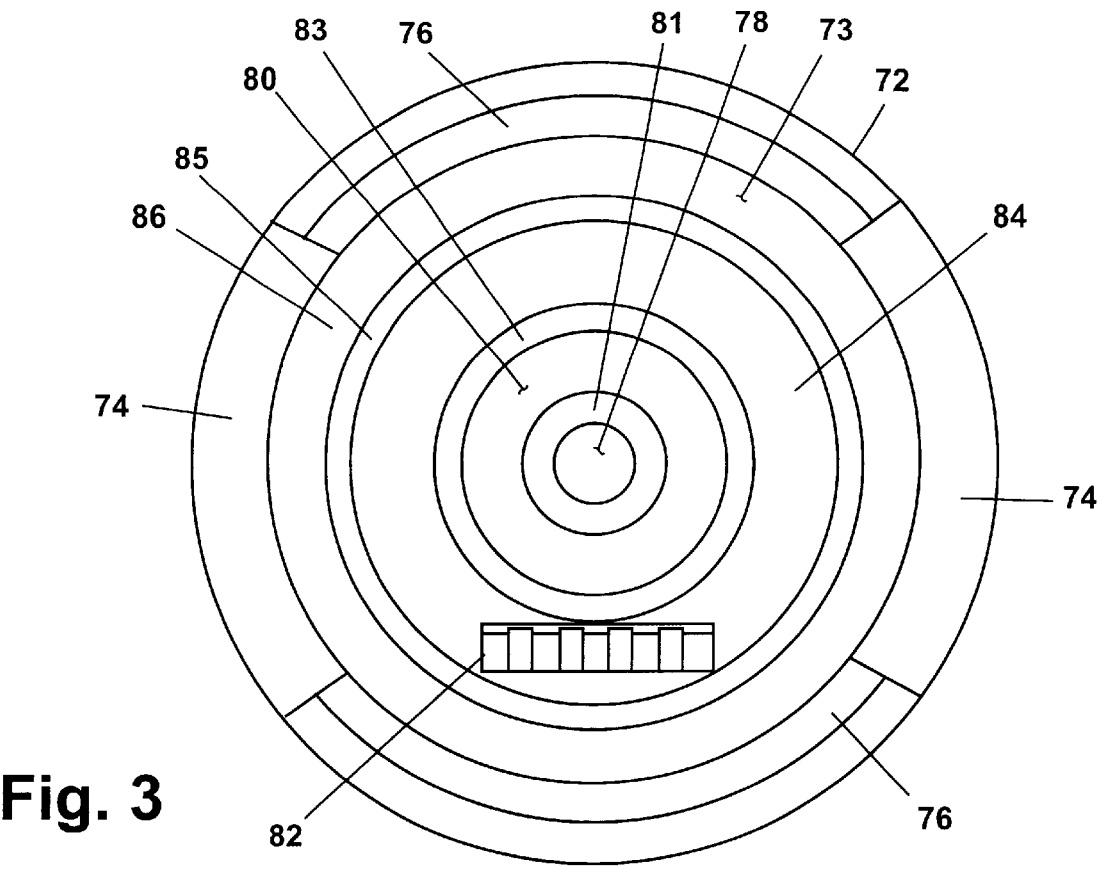
FIG. 3 is a top view of the lower valve body.
Figure 4:
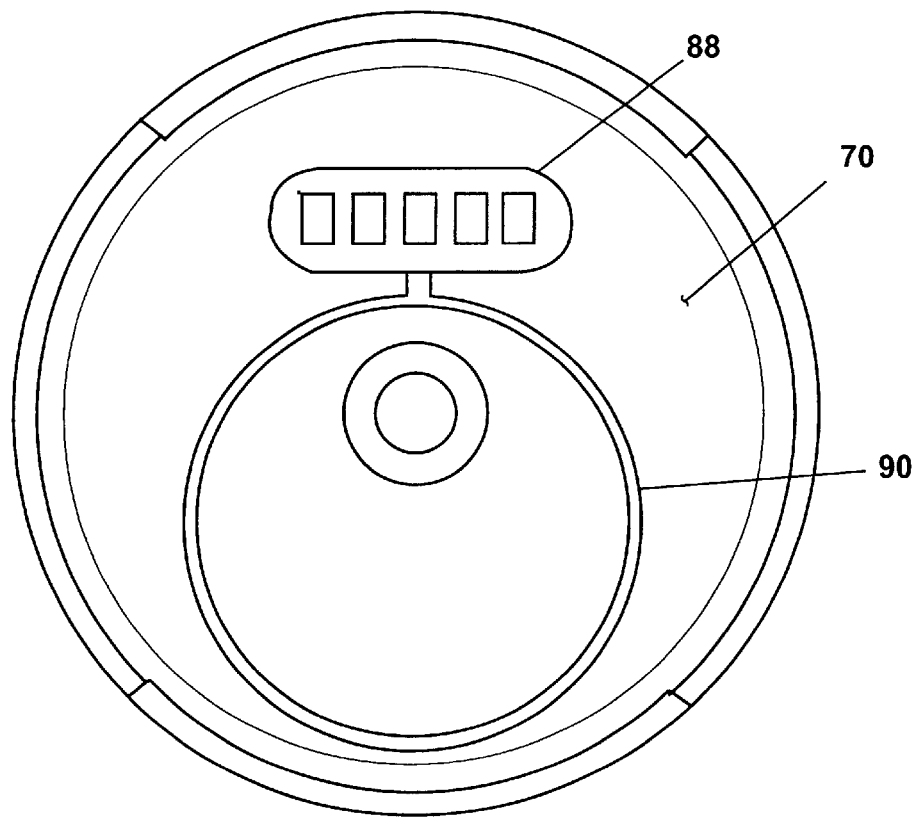
FIG. 4 is a bottom view of the lower valve body.

Referring to FIGS. 1, 3, and 4, the lower valve body portion 14 comprises a bottom wall 70, having an upwardly extending peripheral wall 72 interrupted by diametrically opposing notches 74. The inner surface of the top wall 70 and peripheral wall 72 form a recess 73 that forms a seat for the rotatable disk 18. A guide collar 76 extends upwardly from the peripheral wall 72 and has a slightly smaller radius than the peripheral wall 72.

A spout opening 78 is axially located in the bottom wall 70 and is surrounded by an O-ring groove 80. A filtered output opening 82 also passes through the bottom wall 70 and is located in a filtered fluid outlet channel 84 formed in the bottom wall 70, which is concentrically oriented with respect to the O-ring groove 80 in the spout opening 78. Also formed in the bottom wall 70 is an O-ring groove 86 concentrically located outside the filtered fluid outlet channel 84 and interior of the peripheral wall 72.

The O-ring groove 80, outlet channel 84, and O-ring groove 86 effectively define circular portions or rings 81, 83, and 85, respectively, in the bottom wall 70. The tops of these rings define the bottom wall upper surface and form a bearing against which the rotatable disk 18 abuts when the valve is assembled.

A filtered outlet spout 88 extends away from the exterior side of the bottom wall 70 along with a nozzle mounting collar 90. The nozzle-mounting collar 90 is threaded, permitting the nozzle 34 to be threaded onto the nozzle-mounting collar to mount the nozzle to the lower body portion.

Figure 5:
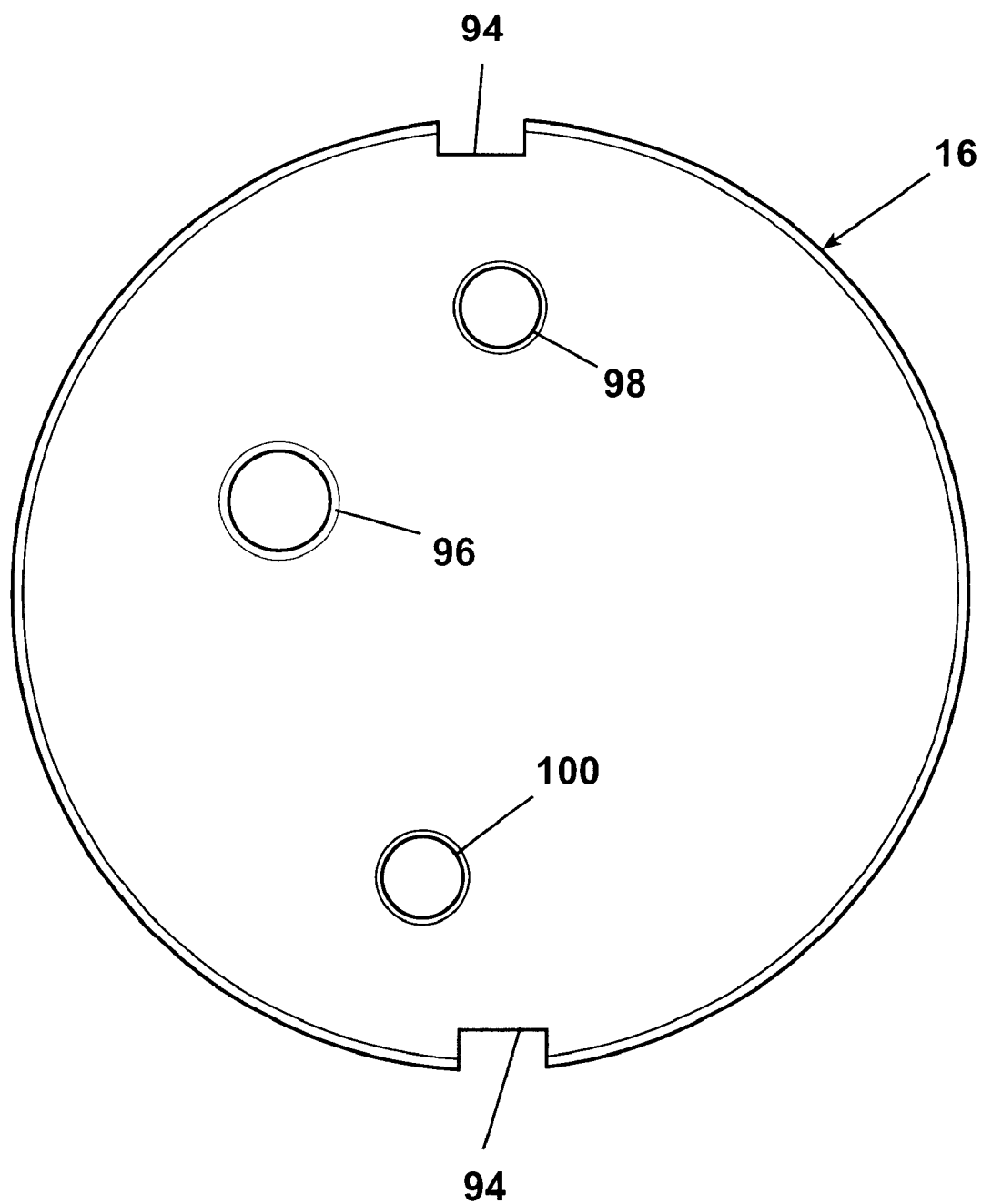
FIG. 5 is a top view of the fixed ceramic disk.

Referring to FIGS. 1 and 5, the fixed ceramic disk 16 is generally circular with diametrically opposing keyholes 94 extending into the edge of the disk 16. The key holes 94 are sized to receive the keys 46 of the upper valve body portion 12 to fix the relative position of the fixed ceramic disk 16 with respect to the upper valve body portion 12. Multiple pass-through openings 96, 98, and 100 extend through the fixed ceramic disk 16. The pass-through openings 96, 98, and 100 correspond to the pass-through openings 54, 56, and 64 of the upper valve body portion 12. The fixed ceramic disk 16 is mounted to the upper valve body portion 12 and permits the flow of fluid from the pass-through openings of the upper valve body portion 12 to also pass through the corresponding openings in the fixed ceramic disk 16.

Figure 6:
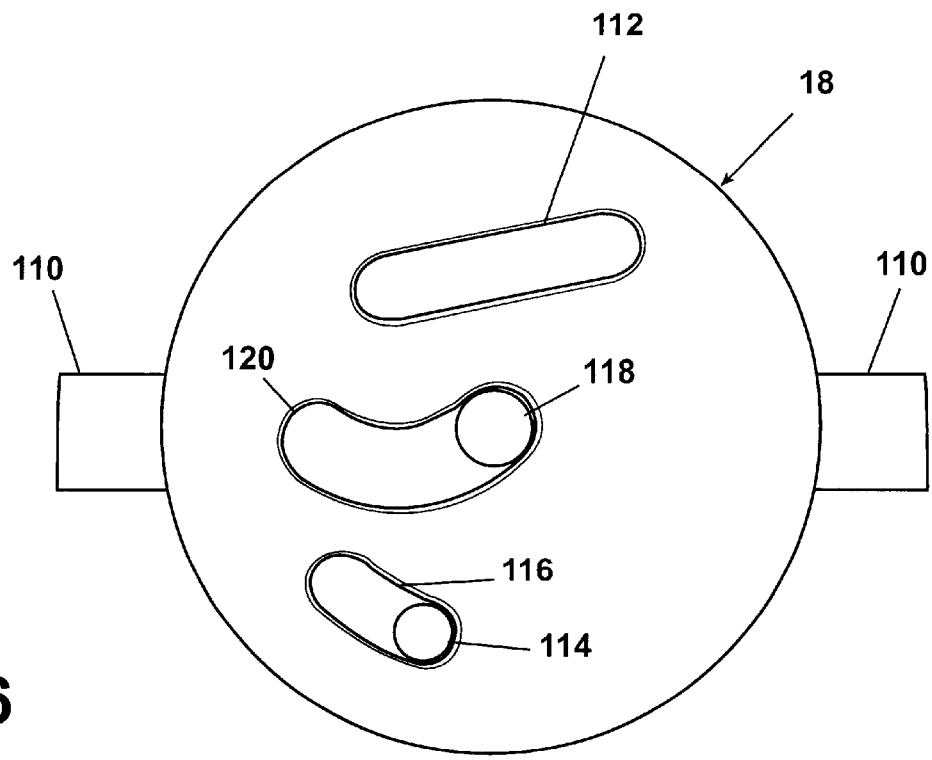
FIG. 6 is a top view of the rotating ceramic disk.
Figure 7:
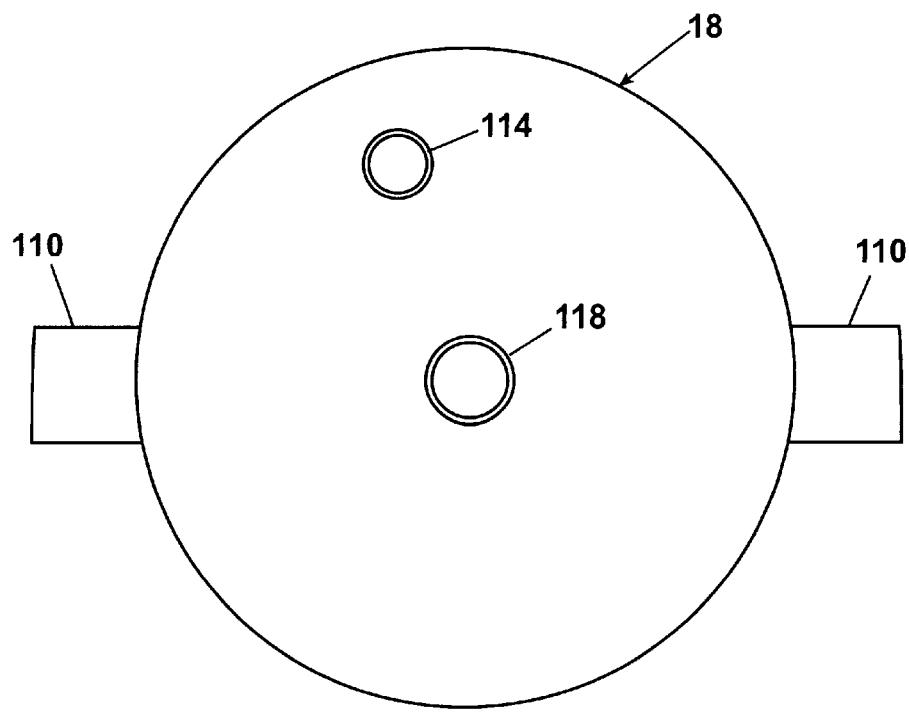
FIG. 7 is a bottom view of the rotating ceramic disk.

Referring to FIGS. 1, 6 and 7, the rotating ceramic disk 18 has a generally circular shape from which extend keys 110, which are sized to be received within the notches 44, 74 of the upper and lower valve body portions 12, 14 when the valve is assembled. The rotating ceramic disk is of a smaller diameter than the fixed ceramic disk. An elongated blind opening 112 is located on the upper surface of the rotating ceramic disk 18 and extends slightly radially outwardly from the center of the rotating ceramic disk 18. The elongated opening 112 is used to establish fluid communication between the fluid inlet opening 96 and filter inlet opening 98 of the fixed ceramic disk 18.

A pass-through opening 114 in combination with an arcuate blind opening portion 116 is also provided on the upper surface of the rotating ceramic disk 18. The pass-through opening 114 fluidly connects the filter outlet pass-through opening 100 of the fixed ceramic disk to the filtered fluid outlet channel 84 of the lower valve body portion 14. The corresponding arcuate blind portion 116 aids in keeping the pass-through opening 114 in fluid communication with the filter outlet pass-through opening 104 for a predetermined rotational range of the rotating ceramic disk 18.

A pass-through opening 118 in combination with an arcuate blind opening 120 is provided on the upper surface of the rotating ceramic disk 18 and establishes fluid communication between the fluid inlet pass-through opening 96 of the fixed ceramic disk 16 and the spout opening 78 of the lower valve body portion 14. The arcuate blind opening 120 is shaped to maintain fluid communication between the fluid source pass-through opening 96 of the fixed ceramic disk 16 and the pass-through opening 118 of the rotating ceramic disk 18 through a predetermined rotational range of the rotating ceramic disk 18.

Figure 8:
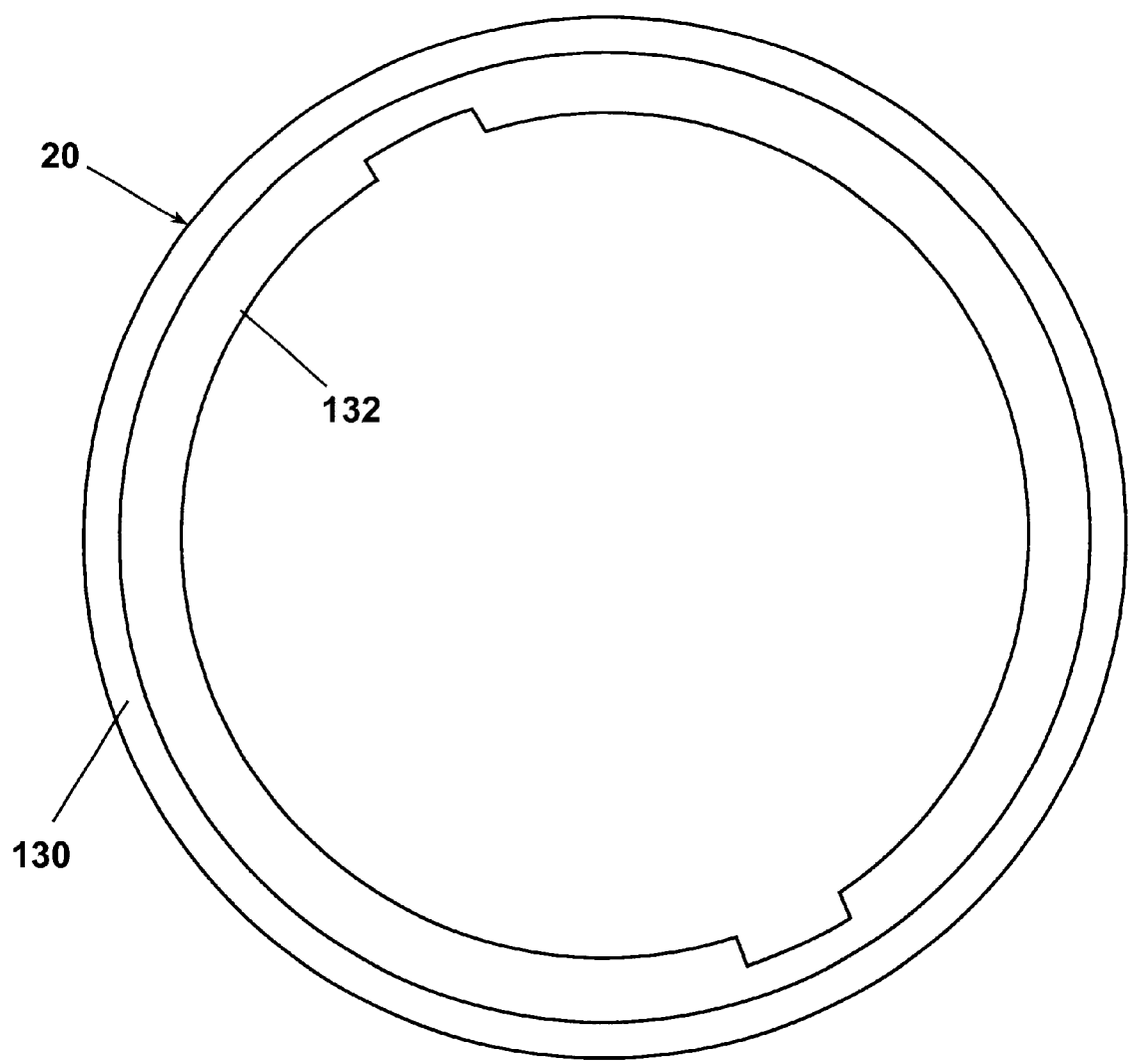
FIG. 8 is a bottom view of the selection ring.

Referring to FIGS. 1 and 8, the selection ring 20 comprises an outer collar 130 and an inwardly directed annular lip 132 in which are formed diametrically opposing key holes 134, sized to receive the keys 110 of the rotating ceramic disk 18 when the valve is assembled.

Figure 9:
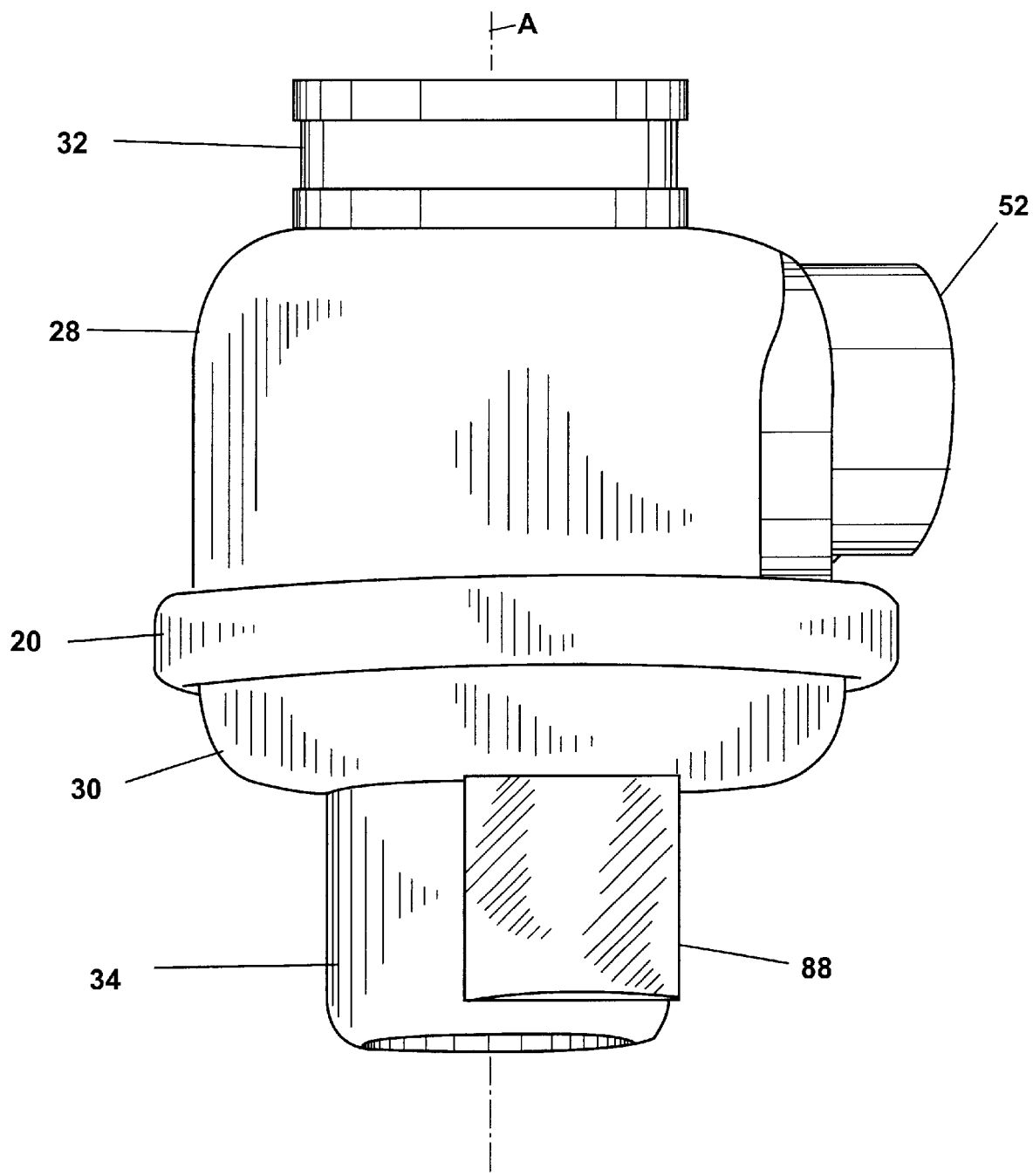
FIG. 9 is a side view of the assembled valve.
Figure 10:
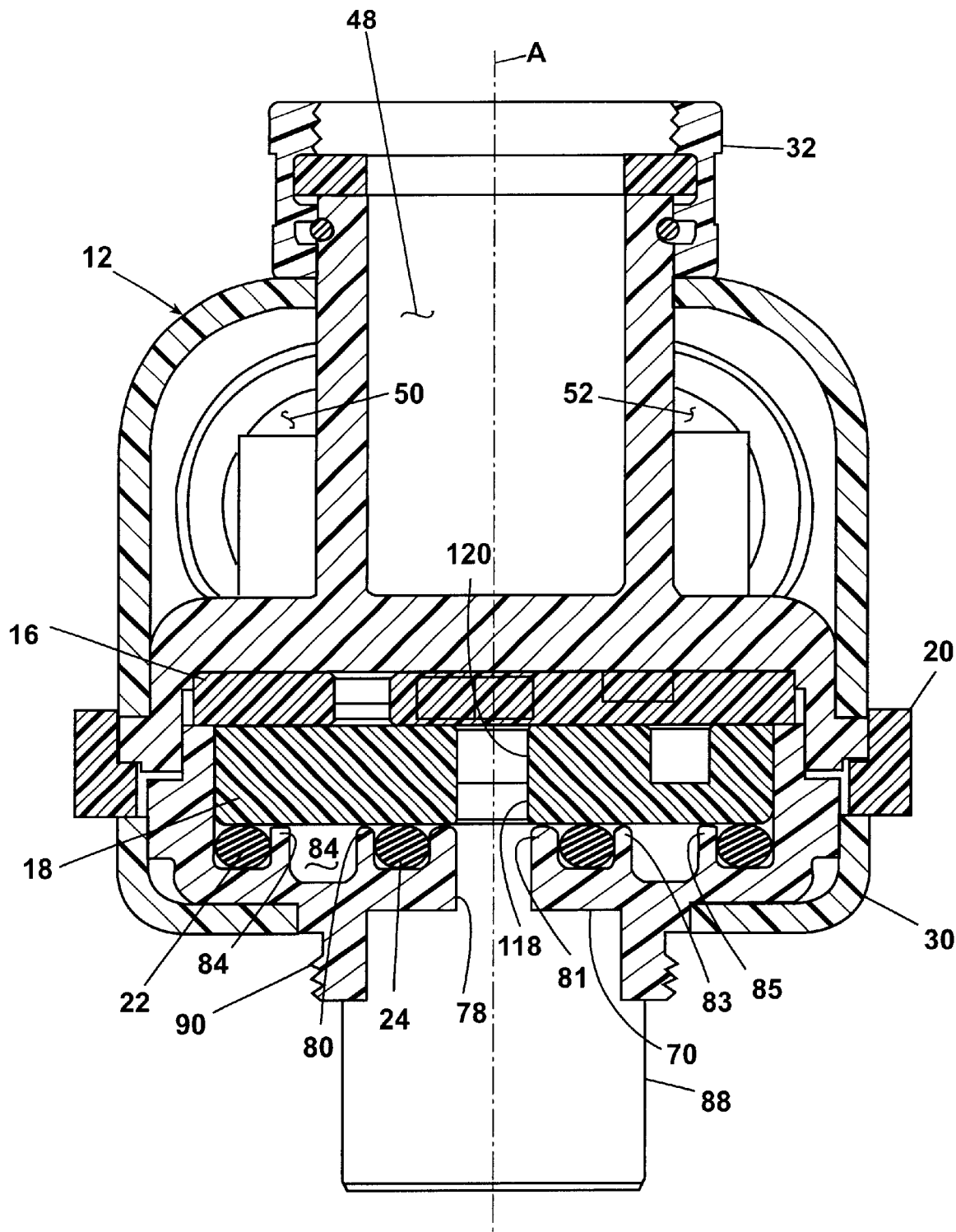
FIG. 10 is a longitudinal sectional view of the assembled valve of FIG. 9 and illustrates the independent mounting of the fixed disk.

Referring to FIGS. 1, 9 and 10, the assembly of the valve 10 will be described in detail. Initially, it should be noted that the particular sequence of the assembly as described here is only one of the many possible combinations for assembling the valve. Many of the various ways to assemble the valve are equally preferred. Therefore, the described assembly of the valve is only meant to better describe the interfitting of the various valve elements and is not meant to limit the valve assembly to the described sequence.

The assembly begins by creating a lower body portion sub-assembly. The O-rings 24, 26 are inserted into their corresponding O-ring grooves 80, 86 of the lower valve body portion 14. The rotating disk 18 is placed on the bearing formed by the upper surface of the rings 81, 83, 85 of the bottom wall 70 so that the rotating ceramic disk keys 110 lie between the notches 74 of the peripheral wall 72. The selection ring 20 is oriented so that the key holes 134 align with the keys 110 on the rotating ceramic disk and is pressed onto the lower valve body 14 so that the guide cover 76 passes through the lip 132 of the selection ring 20 and the keys 110 seat within the key holes 134. The lower valve body portion 14, rotating ceramic disk 18 and selection ring 20 can be handled as a subassembly by merely compressively holding together the lower valve body portion 14 and the selection ring 20.

Once the lower valve body portion subassembly 14 is completed, the O-rings 22 are placed within the corresponding O-ring grooves 60, 62, and 64 and the upper valve body portion 12 to begin the upper valve body portion subassembly. The fixed ceramic disk 16 is oriented relative to the upper valve body portion 12 so that the key holes 94 of the fixed ceramic disk 16 align with the keys 46 of the upper valve body portion 12. The fixed ceramic disk 16 is pressed into the annular wall 42 of the upper valve body portion 12 until the keys 46 seat within the key holes 94, completing the upper valve body portion 12 subassembly.

The upper and lower valve body portion subassemblies are brought together by inserting the guide collar 76 of the lower valve body portion 14 into the interior of the annular wall 42 of the upper valve body portion 12. The guide collar 76 abuts the bottom surface of the fixed ceramic disk 16 and compressively retains the fixed ceramic disk therebetween. As the lower body 14 is interfitted with the upper body portion 12, the O-rings 24, 26 and possibly the upper surface of the lower body portion press against the lower surface of the rotating ceramic disk 18 to compress the upper surface of the rotating ceramic disk 18 against the bottom surface of the fixed ceramic disk 16 to apply the stack-up pressure between the ceramic disks. The upper and lower valve body portions 12, 14 are then sonically welded together or attached by any other suitable means.

When assembled, the valve cartridge 10 has a longitudinal axis A. The axis A preferably passes through the center point of the ceramic disks.

The height of the guide collar 76 is such that the fixed ceramic disk 16 is compressively retained between the guide collar 76 and the top wall 40 just as or slightly before the peripheral wall 72 of the lower valve body portion 14 abuts the peripheral wall 42 of the upper valve body portion. The depth of the recess 73 is substantially equal to or greater than the thickness of the rotating ceramic disk 18. The structural relationship between the collar 76 and the recess 73 permits the mounting of the fixed ceramic disk to the upper valve body portion at fixed location relative to the upper valve body portion and the axis A, while preventing the movement of the fixed disk along the axis A.

The benefit of such a fixed mounting of the fixed disk to the upper body portion such that it is not moveable relative to the axis A is that the tolerance variation attributable to the fixed disk is controlled without reliance on the biasing force of the O-ring. In other words, the tolerance variation attributable to variations in the thickness of the fixed disk is controlled by the lower body portion pressing the upper face of the fixed ceramic disk against the top wall of the upper body portion. In previous valve cartridges, the biasing force associated with the O-ring would have to compensate for the tolerance variation in both the fixed and rotation ceramic disks, which lead to higher than desired forces needed to rotate the rotating disk.

To complete the assembly of the valve 10, the collar 32 is mounted to the upper body portion 12, which is positioned over the upper valve body portion 12 and affixed thereto preferably by sonic welding or adhesive. The lower body cover 30 is then slidably mounted over the filter nozzle 88 and collar 90 and affixed to the lower valve body portion 14, preferably sonic welding or adhesive. The nozzle 34 is positioned over the collar 90 and affixed thereto in a manner similar to the upper and lower covers 28, 30.

As best seen in FIG. 10, one important advantage of the valve cartridge 10, according to the invention, is that the valve stack-up comprises only the rotating ceramic disk 18 and the O-rings 24, 26. The fixed ceramic disk 16 is effectively taken out of the stack-up since it is compressively retained between the guide collar 76 and the lower surface of the bottom wall 40 independent of the mounting of the rotating disk. Thus, the compressive force applied by the lower body portion and O-rings to the rotating disk need only account for the tolerance variation in the rotating disk, instead of both of the fixed and rotating disk as in the prior art valve cartridges.

The compressive force applied by the O-rings is a function of the resiliency of the O-rings and the degree to which they are compressed up the mounting of the lower body portion to the upper body portion. Since, in the preferred design, the insertion of the lower body portion relative to the upper body portion is limited by the annular collar abutting the fixed disk, the axial compression of the O-rings is so limited. The biasing force associated by the axial compression is attributable to the resiliency of the material forming the O-rings. With these factors in mind, the cross-section size of the O-rings can be selected to control the amount of material to be compressed and the hardness of the material can be selected to control the force that is applied by the compressed O-ring to the rotating ceramic disk. By controlling these characteristics of the O-rings, and any other biasing element, the force applied by the O-rings against the rotating ceramic disk can be controlled, which permits control of the stack-up pressure, which is the O-ring force acting over the area of the rotating ceramic disk.

In essence, the O-rings function like a spring. The O-rings can be replaced by any other suitable biasing element, such as a spring. The O-ring is preferred because it performs the dual function of sealing the rotating ceramic disk relative to the lower body portion and applying the compressive force.

An additional advantage of the stack-up of the valve cartridge 10 is that the bearing surface, to the extent it is needed, is integrated with the lower valve body 14, effectively eliminating it's tolerance losses from the stack up. The bearing function of the valve cartridge 10 is performed by the portion of the bottom wall 70 not forming a part of the O-ring grooves 80, 86 and the filter fluid outlet channel 84. Thus, any tolerance variation attributable to the bearing does not need to be accounted for by the stack-up pressure applied by the lower body portion and the O-ring, unlike the prior art valve cartridges.

Therefore, the stack-up pressure as applied by the O-rings as they are compressed against the bottom wall 70 to seal the fixed and rotating ceramic disks 16 and 18 need only be concerned about the tolerance variances associated with the rotating ceramic disk 18 and not the combined tolerance losses of the rotating ceramic disk, fixed ceramic disk, and bearing, as in prior art valve cartridges. Moreover, since only the tolerance variation of the rotating ceramic disk need be accounted for in the stack-up pressure, the characteristics of the material for the biasing element, such as the O-ring, can be more accurately selected. Typically, these characteristics, in the case of an O-ring, are the hardness and the cross-sectional area and shape. These characteristics are selected such that the force applied to the rotating ceramic disk is such that a seal is maintained between the rotating and fixed disk. The harder (less resilient) the material and the greater the cross-sectional area the greater will be the force transferred from lower body portion to the rotating ceramic disk.

The major operational portions of the valve 10 will be described with respect to FIGS. 11–16. FIGS. 11 and 12 illustrate the relative positions of the fixed ceramic disk 16, rotating ceramic disk 18, and lower valve body portion 14 when the rotating ceramic disk 18 is in the filtered output position along with the fluid flow path through the valve 10. For illustrative purposes, FIG. 11 shows the lower valve body portion 14 and its corresponding spout opening 78, filtered output 82, and filter fluid outlet channel 84 in phantom. The water inlet pass-through opening 96, filter inlet pass-through opening 98, and filter output pass-through opening 100 of the fixed ceramic disk along with the elongated blind opening 112, filter pass-through opening 114 and arcuate blind opening 116, and fluid source through opening 118 and arcuate blind opening 120 are illustrated as solid lines even though the pass-through openings 96, 98, 100 of the fixed ceramic disk 16 are positioned above the rotating ceramic disk 18.

In the filtered output position, the rotating ceramic disk 18 is rotated counterclockwise as seen in FIG. 11 looking from the upper valve body portion 12 down to the lower valve body 14 until the keys 110 abut the peripheral wall 72. In this position, the elongated blind opening 112 of the rotating ceramic disk 18 fluidly connects the fluid source inlet pass-through opening 96 to the filter inlet pass-through opening 98, diverting the fluid supply entering the fluid inlet 48 of the upper valve body portion 12 to the filter inlet 50. The filter pass-through opening 114 and its corresponding arcuate blind opening 116 are fluidly connected to the filter pass-through opening 100 and the fixed ceramic disk 16, permitting the output from the filter to pass through the filter outlet 52, through the ceramic disks 16, 18 into the fluid channel 84 of the lower valve body 14 where the filtered output exits through the filtered output 82 and its corresponding filter nozzle 88.

FIGS. 13 and 14 illustrate the relative position of the fixed ceramic disk 16, rotating ceramic disk 18, and lower valve body portion 14, along with the fluid flow path through the valve cartridge 10 when the valve is in the neutral or off position. In the neutral position, the rotating ceramic disk 18 is rotated through approximately 30 degrees clockwise (as seen in FIG. 13) from the filtered output position of FIG. 11. In the neutral position, the elongated blind opening 112 is no longer in fluid communication with either the source inlet through opening 96 or filter inlet through opening 98 of the fixed ceramic disk 16, preventing the flow of fluid from the fluid source to the filter. However, the filter pass-through opening 114 and its corresponding arcuate blind opening 116 are still in fluid communication with the filter outlet pass-through opening 100 of the fixed ceramic disk 16 and the filter fluid outlet channel 84, permitting the draining of any pressurized fluid from the filter. It is important for the longevity of the the filter device, that the fluid source is shut off to the filter prior to the shutting off of the flow from the filter, which effectively permits the draining of any pressurized fluid from the filter and reducing the likelihood that a back pressure can be created in the fluid system that might adversely impact the seals of the filter and the valve.

FIGS. 15 and 16 illustrate a straight through output position of the valve cartridge 10. FIGS. 15 and 16 illustrate the relationship of the fixed ceramic disk 16, rotating ceramic disk 18, and lower valve body portion 14 along with the corresponding fluid path through the valve cartridge 10. In the flow through position, the elongated blind opening 112 and filter pass-through opening 114 and its corresponding arcuate blind opening 116 are no longer in fluid communication with any pass-through openings of the fixed ceramic disk 16. However, the fluid source through opening 118 and its corresponding arcuate blind opening 120 are in fluid communication with the fluid source pass-through opening 96 with a fixed ceramic disk 16 and the spout opening 78 and the lower valve body portion 14, permitting the flow of fluid from the fluid inlet 48 through the valve cartridge 16, 18 and out through the spout opening 78 and nozzle 34.

Preferably, the rotating ceramic disk 18 rotates through approximately 60. If the entire rotational range is thought of in terms of −30° to 30° the neutral position occurs at 0°, the filtered output at −30° and the pass-through output at 30°. The rotating ceramic disk is rotated by turning the selection ring 20.

Figure 17:
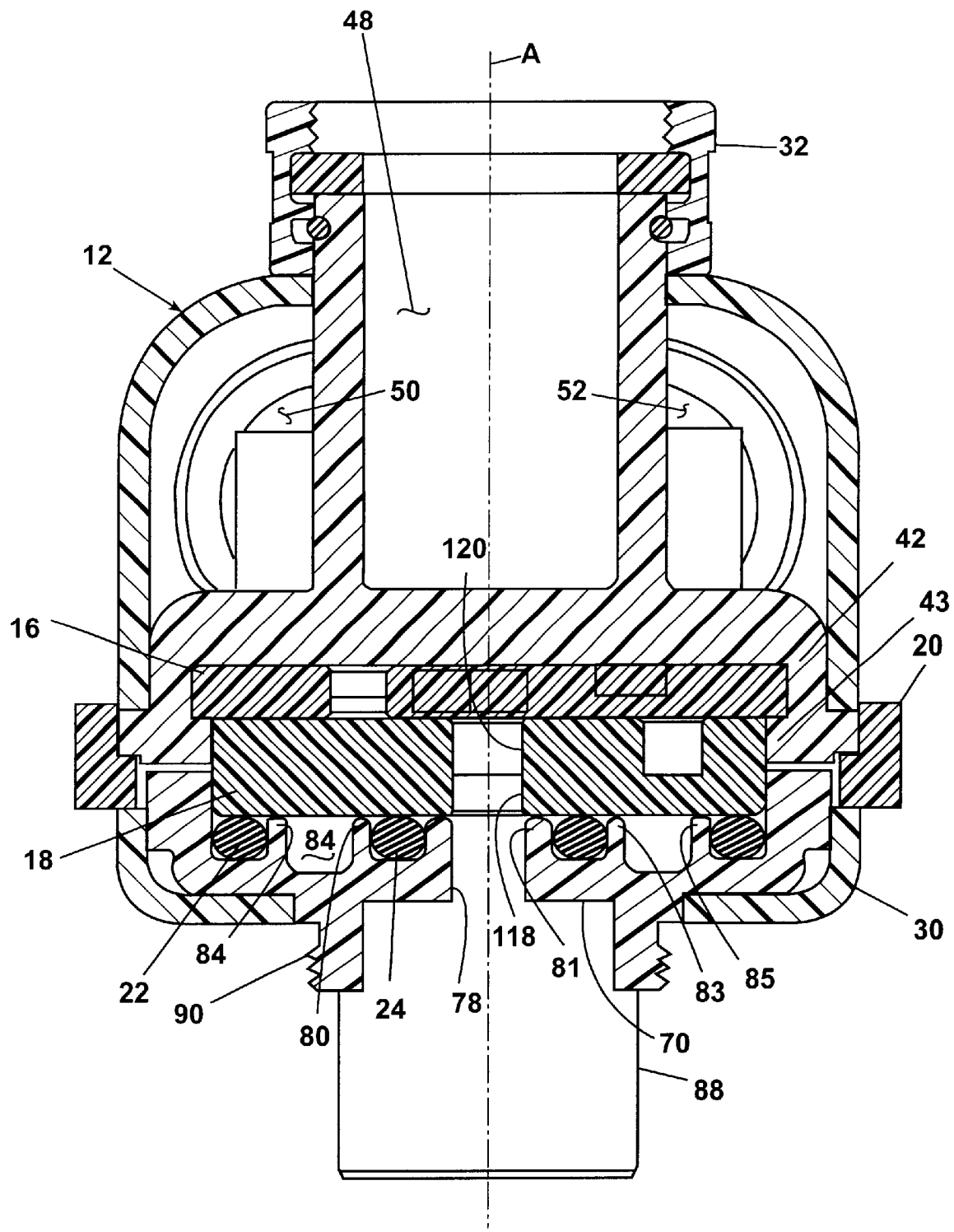
FIG. 17 is a sectional view similar to FIG. 10 of an alternative construction of the valve cartridge with fixed disk being mounted by to the upper body portion independently of the lower body portion.

FIG. 17 illustrates an alternative construction for the valve cartridge 10. The only difference between the alternative construction of FIG. 17 and the valve cartridge of FIGS. 1–16 is in the manner in which the fixed ceramic disk is mounted to the upper body portion. Therefore, like numerals will be used to identify like parts in both constructions.

In the alternative construction of FIG. 17, the upper body portion annular wall 42 comprises an inwardly directed radial lip 43 that extends over the fixed ceramic disk 16 to compressively retain the fixed ceramic disk within the recess 45. The radial lip 43 can be formed in many different ways. For example, the fixed ceramic disk can be in-molded with the upper body portion. The radial lip can be a staked or bent portion of the annular wall 42.

Since the radial lip 43 performs the function of the collar 76, the lower body portion need not have the collar 76 of the first embodiment. In all other aspects the alternative constructions are identical.

While the invention has been specifically described in connection with certain specific embodiments thereof, it is to be understood that this is by way of illustration and not of limitation, and the scope of the appended claims should be construed as broadly as the prior art will permit.

What is claimed is:

1. A valve cartridge for controlling the flow of fluid through a fluid conduit that fluidly connects a fluid source to a fluid outlet, the valve cartridge comprising:
   first and second valve body portions defining a flow passage fluidly connecting the fluid source to the fluid outlet when the valve cartridge is fluidly coupled to the fluid conduit and having a longitudinal axis;
   a first ceramic plate mounted to the first body portion within the flow passage and with the longitudinal axis extending through the first ceramic plate, such that the first ceramic plate is axially immovable relative to the first body portion;
   a second ceramic plate mounted to the second body portion within the flow passage such that the second ceramic plate is moveable along the longitudinal axis and maintained in an axially facing relationship with the first ceramic plate;
   each of the first and second ceramic plates having a pass through opening and being moveable relative to each other between a first position, where the pass through openings are not aligned and fluid flow through the flow passage is prohibited, and a second position, where the pass through openings are aligned to permit fluid flow through the flow passage; and
   a biasing element disposed between the second body portion and the second ceramic plate to bias the second ceramic plate against the first ceramic plate along the longitudinal axis.

2. A valve cartridge according to claim 1, and further comprising a bearing disposed between one of the first or second body portions and the corresponding first or second ceramic plates and in abutting relationship with the corresponding first or second ceramic plates to protect the one of the first and second body portions from the relative movement of the first and second ceramic plates.

3. A valve cartridge according to claim 2, wherein the second body portion has a bottom wall against which the second ceramic plate abuts and the bottom wall forms the bearing.

4. A valve cartridge according to claim 3, wherein at least one channel is formed in the bottom wall and the biasing element is a resilient seal disposed within the at least one channel to seal the second ceramic plate relative to the second body portion and bias the second ceramic plate against the first ceramic plate.

5. A valve cartridge according to claim 4, wherein the resilient seal is an O-ring and the second body portion pass through opening is located in the bottom wall such that it is circumscribed by the O-ring.

6. A valve cartridge according to claim 1, wherein the first body portion comprises a top wall and an annular wall depending therefrom that define a recess sized to receive the first ceramic plate to form a first valve seat in which the first ceramic plate is retained.

7. A valve cartridge according to claim 6, wherein the second body portion comprises a collar that defines a portion of a recess sized to receive the second ceramic plate and forming a second valve seat in which the second ceramic plate is received.

8. A valve cartridge according to claim 7, wherein the first body portion comprises a radially extending lip that retains the first ceramic plate within the first body recess.

9. A valve cartridge according to claim 7, wherein the collar is sized such that the collar abuts the first ceramic plate to bias the first ceramic plate within the first valve seat to compressibly retain the first ceramic plate against the top wall.

10. A valve cartridge according to claim 9, wherein the collar has an upper end that is approximately coterminous with an upper surface of the second ceramic plate.

11. A valve cartridge according to claim 10, wherein the depth of the second body portion recess is approximately equal to the thickness of the second ceramic plate.

12. A valve cartridge according to claim 7, wherein the collar has at least one notch formed therein and the second ceramic plate has a key extending through the notch wherein the second ceramic plate is moved between the first and second positions by moving the key between the ends of the notch.

13. A valve cartridge according to claim 12, wherein the collar comprises two diametrically opposed notches and the second ceramic plate has two diametrically opposed keys, and further comprising an outer collar circumscribing the second body portion and having keyholes hat receive the second ceramic plate keys wherein the rotation of the outer collar moves the second ceramic plate.

14. A valve cartridge according to claim 6, wherein the first body portion further comprises at least one key extending into the first body portion recess and the first ceramic plate has a keyhole sized to receive the key when the first ceramic plate is received within the recess to fixed the rotational position of the first ceramic plate relative to the first body portion.

15. A valve cartridge according to claim 1, wherein the first and second ceramic plates are disks.

16. A valve cartridge according to claim 15, wherein the first body portion further comprises:
   a filter inlet passage; and
   a filter outlet passage; the second body portion further comprises a filtered outlet; the first ceramic disk comprises:
      a second pass through opening aligned with the filter inlet passage, and
      a third pass through opening aligned with the filter outlet passage; and the second ceramic disk comprises:
         a blind opening fluidly connecting the first ceramic pass through opening to the first ceramic disk second pass through opening when the second ceramic disk is in a third position, and
         a second pass through opening fluidly connecting the filter outlet passage to the filtered outlet when the second ceramic disk is in the third position;
   wherein, when the second ceramic disk is in the first position, the first ceramic disk pass through opening is fluidly unconnected with either the second ceramic disk pass through opening and the blind opening to prevent fluid flow through the valve cartridge, when the second ceramic disk is in the second position, the second ceramic disk pass through opening is fluidly connected to the first ceramic disk pass through opening permitting fluid flow from the fluid source to the fluid outlet, and when the second ceramic disk is in the third position, fluid flow is permitted between the fluid source and the filtered outlet.

17. A valve cartridge according to claim 16, wherein the pass through opening, the second pass through opening, and the third pass through opening of the first ceramic disk and the pass through opening, the second pass through opening, and the blind opening of the second ceramic disk are located on the first and second ceramic disks, respectively, such that the second ceramic disk is rotated in a first direction from the first position to the second position and in a second direction, opposite the first direction, from the first position to the third position.

18. A valve cartridge according to claim 1, wherein the biasing element is made from a resilient material.

19. A valve cartridge according to claim 18, wherein the hardness and size of the resilient material is selected to control the biasing force applied to the second ceramic plate.

20. A valve cartridge according to claim 19, wherein the biasing element is an O-ring seal.

21. A valve cartridge according to claim 1, wherein the first ceramic plate is located at a fixed position along the longitudinal axis independent of the position of the second ceramic plate along the longitudinal axis.

\* \* \* \* \*